Figure 1:
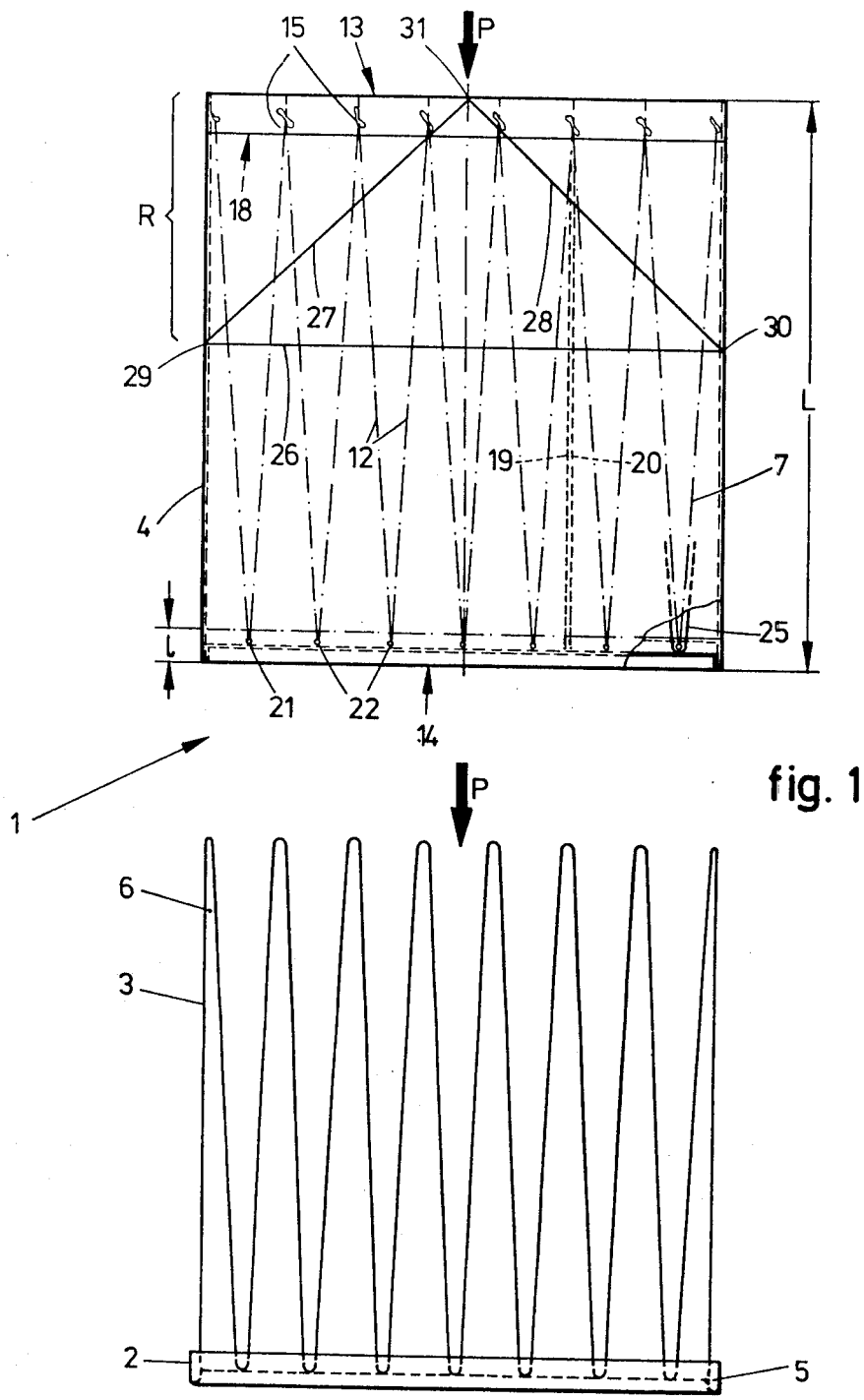

United States Patent [19]

Kamps et al.

[11] 4,272,267

[45] Jun. 9, 1981

[54] GAS FILTER

[75] Inventors: Grietinus R. L. Kamps, Ter Apel; Jan S. P. Moltzer, Dalerveen; Pieter J. Platteeuw, Veenoord, all of Netherlands

[73] Assignee: American Air Filter Company, Inc., Louisville, Ky.

[21] Appl. No.: 93,926

[22] Filed: Nov. 13, 1979

[30] Foreign Application Priority Data

Jan. 15, 1979 [DE] Fed. Rep. of Germany ....... 2901414

[51] Int. Cl.³ ............................................ B01D 46/02
[52] U.S. Cl. ........................................ 55/499; 55/509; 55/521; 55/DIG. 12; 55/DIG. 31
[58] Field of Search .......... 55/380, 482, 497, 498–501, 55/503, 509, 521, DIG. 12, DIG. 31, 529; 210/493 FR, 497 R; 229/17 G

[56] References Cited

U.S. PATENT DOCUMENTS

| | | | |
|---|---|---|---|
| 2,907,407 | 10/1959 | Engle et al. | 55/501 |
| 2,909,237 | 10/1959 | O'Dell | 55/529 |
| 3,187,489 | 6/1965 | Bauder et al. | 55/509 |
| 3,222,850 | 12/1965 | Hart | 55/500 |
| 3,440,807 | 6/1969 | Gaines, Jr. | 55/497 |
| 4,177,050 | 12/1979 | Culbert el al. | 55/DIG. 31 |

*Primary Examiner*—David L. Lacey
*Attorney, Agent, or Firm*—Jon C. Winger; Thomas G. Anderson

[57] ABSTRACT

A gas filter comprising a square frame and an interchangeable filter package containing a filter web of a folded zig-zag configuration forming a plurality of proximate filter pockets received on a support grid mounted on the frame and having a shape complementary to the folds of the filter web.

9 Claims, 5 Drawing Figures

GAS FILTER

This invention relates to a gas filter, in particular a room air filter, comprising a square frame and an interchangeable filter package including a gas entrance and a gas discharge port and containing a filter web with a zig-zag configuration for forming a plurality of proximate filter pockets, said filter web being secured between encircling walls, and further comprising a support grid for receiving the same which is mounted in the frame and which has a shape complementary to the folds of said filter web.

A gas filter of the afore-mentioned type is already known from German patent specification No. 1,293,005. In this filter only the encircling walls extending in the direction of folding have a stiff construction and consist of cardboard, for example. The two encircling walls disposed transversely to the direction of folding are manufactured of a foldable foil. The filter web which is folded in a zig-zag configuration is secured along the free longitudinal edges to these foil-like encircling walls in a gasproof manner.

This design makes it possible to place the filter package in a transport form in which it takes up little space. If the two stiff encircling walls are pressed together, the flexible encircling walls will be folded together. The same thing applies as well for the plastic filter web which is already folded in a zig-zag configuration. In the transport position, the two stiff encircling walls are then as close to one another as the folding of the flexible encircling walls and the enclosed filter web permit.

This flexibility, however, is disadvantageous during assembly of the known gas filter. The support grid determines the shape which the filter package must assume during operation. This means that, when assembling the filter package and the zig-zag filter web, the filter package must first be expanded to the size of the support grid. After the filter package has been pulled apart completely, it can then be slid over the support grid.

In order to avoid damage to the filter web and thus an impairment of the filtering action, it is necessary in the known filter for two operators to hold the filter package on opposite sides and to lower it slowly onto the support grid. This is all the more difficult, since the zig-zag filter web only has its edges affixed to the flexible foils on the sides and it can easily happen that one or more of the foils are misaligned relative to the support grid when the filter package is mounted in place.

If the gas filter becomes soiled, it must be replaced. When removing the known gas filter, it is a drawback that the dirt caught therein can escape again when this filter is again placed or arranged in its transport form, since in this case the volume is reduced again by pushing the two stiff encircling walls together, thereby allowing the already entrained dirt particles to be carried out of the filter again by the escaping air. Even in the compacted transport position, there is no guarantee that the dirt will in fact remain in the filter.

The object of the present invention is therefore to provide a gas filter of the type mentioned at the outset which exhibits easy mountability, which can be arranged in a form with reduced volume for transport in which the gas entrance port is also closed.

This object is accomplished in accordance with the invention in that all encircling walls of said filter package have a stiff construction and together form a rigid container, the gas entrance port thereof being adapted to be closed by bending in and folding over the marginal strip of the encircling walls which is adjacent to said port, and that the folds adjacent to said gas discharge port are held by tension means which extend in the direction of the folds and which are anchored in opposing encircling walls.

What is achieved by this construction is that the inventive filter package can be mounted in place easily. Since all encircling walls have a stiff construction and together form a rigid container for the filter package, the filter can easily be pulled over the support grid by a single operator. The container supplies the requisite stability to do so.

In spite of this stiff container construction, it can also be arranged in a transport form in which it takes up lesser volume than in its assembled state. The encircling walls are adapted to be bent in adjacent to the gas entrance port and can close the gas entrance port completely after being folded over. In so doing, one can imagine an unfolding of the encircling walls as is commonly the case with folded boxes, for instance.

Closing off the gas entrance port achieves not only a box shape of the filter with reduced volume, but also results in the advantage that, when a used filter package is transported, the entrained dirt particles will be reliably contained in the interior, since the gas entrance port remains closed during transport.

The suspension of the folds of the filter web adjacent to the gas discharge port provides these folds with stability as the filter package is mounted on the support grid. One need not fear that one or more folds could be out of alignment relative to the folds of the support grid causing difficulties when the filter is placed on the support grid.

In an advantageous further development of the invention, it is provided that the longitudinal edges of two adjacent web segments of said filter web having a common fold are joined together for the purpose of forming a filter pocket.

A mobile arrangement of the filter web within the encircling walls is achieved by joining the longitudinal edges. This facilitates folding the encircling walls together for the transport form of the filter package. The flexibility of the resultant filter pockets thus formed also excludes any possibility of damage to the filter web as the filter package is folded together.

In view of the assembly of the filter, it is advantageous if the longitudinal edges of two adjacent web segments having a common fold at the gas entrance port are joined together. Filter pockets are produced in this case which open towards the gas discharge port. This means that these pockets can be slid onto the support grid easily. They can be lowered onto the individual elements of the support grid much like hoods.

An advantageous further development of the invention consists in that the longitudinal edges of the filter web adjacent to said gas discharge port are attached to the respectively adjacent areas of the encircling walls. In so doing, relatively short sections of the longitudinal edges are attached, e.g. glued, to the respectively adjacent area of the encircling wall, thereby forming a fastening band along the periphery which completely encloses the gas discharge port and which on the one hand contributes to additional stabilization of the filter package adjacent to the gas discharge port and on the other hand increases the sealing action.

Considering simple assembly and dismantling of the filter package, it is favorable if the filter web has its folds adjacent to said gas entrance port secured to the encircling walls by means of flexible retention elements.

If a new filter to be inserted is opened up by erecting the folded-over marginal strips of the encircling walls, the filter web will unfold automatically due to the connection of the encircling walls with the folds of the filter web adjacent to the gas entrance port. This will bring the corresponding folds into the proper position.

In so doing, it can be advantageous if the filter web has tabs on both sides of the folds adjacent to the gas entrance port, said tabs being anchored in slots of the encircling walls extending transversely to the direction of the folds. This method of suspending the folds is inexpensive, since the slots can easily be made in the encircling walls and the tabs can quickly be anchored in these slots. The tabs can also be anchored in place by a fastening means running along the periphery, e.g. by an adhesive tape affixed to the encircling walls. It is also feasible to positively affix the tabs in the slots, e.g. by means of a thickened section provided at the free end of the tabs.

A favorable further development of the invention consists in that, parallel to the filter web, the web is associated with a lubricant and support layer provided on the surface facing towards the gas discharge port. This layer can consist of a nonwoven, formed plastic fabric, for instance. A nylon fleece is especially suitable. Its contribution is to ensure that as the filter package is lowered onto the support grid, it will slide well on the support grid, thereby eliminating any possibility of damage to the filter web. Moreover, the lubricant and support layer also contributes to further stabilize the zig-zag filter web.

In order to be able to close the gas discharge port during transport as well, it is advantageous if the gas discharge opening is adapted to be closed by means of a cover, it being advantageous if the encircling walls project like a border relative to the gas discharge port and the cover being adapted to be inserted into the free space formed thereby. The cover can prevent any possible damage to the gas discharge port during transport. Furthermore, it can also be reused again to cover this port when the filter is removed and transported away.

Figure 2:
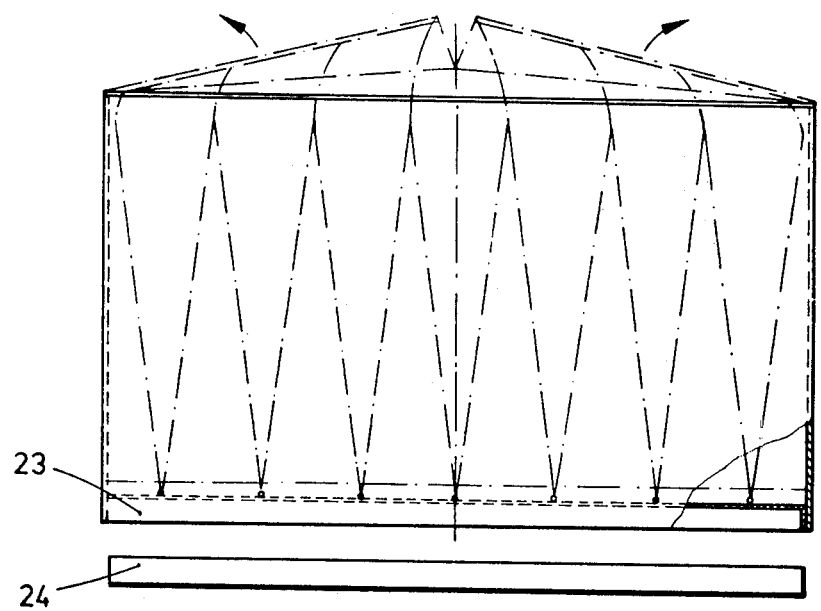
Figure 3:
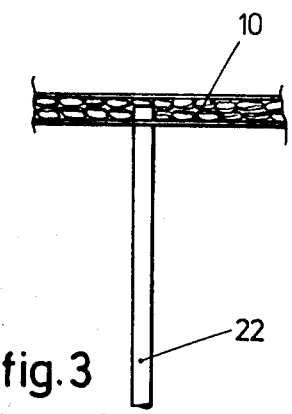
Figure 5:
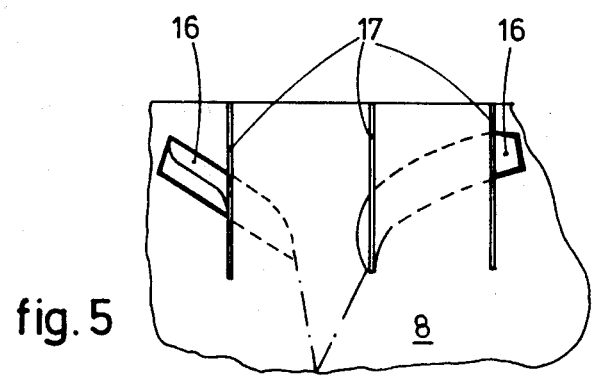
Figure 4:
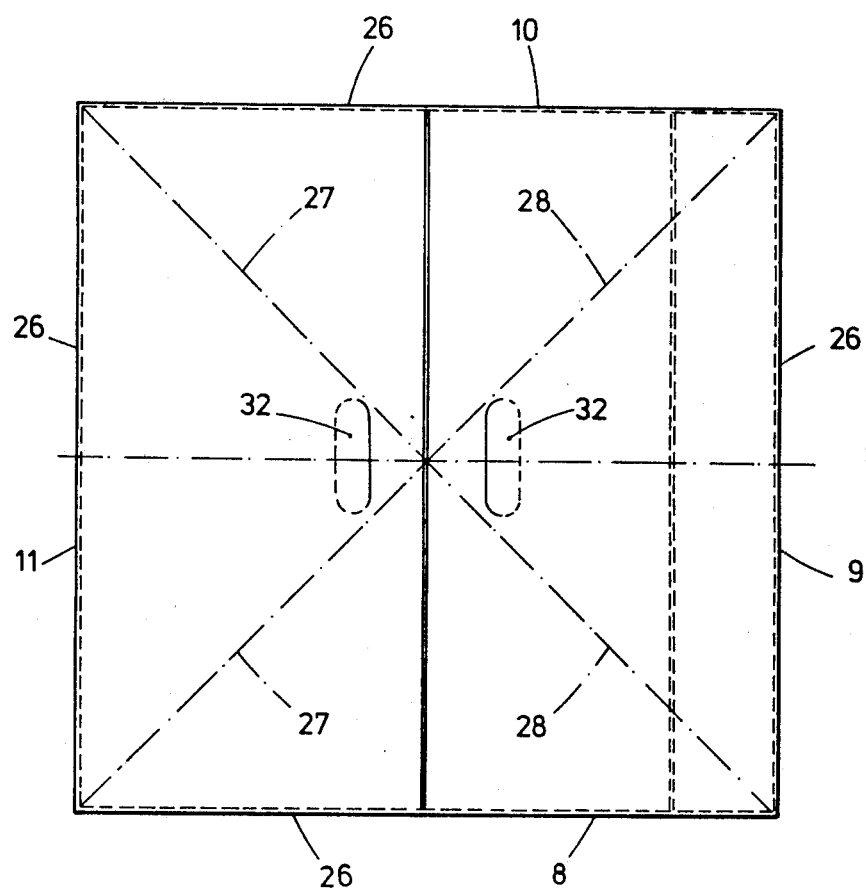

An embodiment of the invention will now be described in the following with reference to a drawing, in which:

FIG. 1 shows a gas filter in accordance with the invention, a filter package being placed over a support grid so as to be ready for use, FIG. 2 is a side view of the filter package shown in FIG. 1 which, however, is in its slightly open transport form, FIG. 3 is a side view through the base area of the filter package, FIG. 4 is a top view of the filter package shown in FIG. 2 in an unopened state, and FIG. 5 is a detailed view of the suspension of the filter web adjacent to the gas entrance port.

A room air filter 1 is shown in the drawing which includes a square frame 2, a support grid 3 and a filter package 4. The frame is designed as a lower containing frame for the gas filter and has a retention groove 5 along its periphery. The use of this retention groove will be explained hereinbelow.

In the illustrated case, the support grid 3 comprises eight grid elements 6 which ascend in a wall-like manner, which converge conically towards their free ends and which are anchored to the frame on their broad base side. Instead of eight grid elements, any other arbitrary number which is larger or smaller can also be provided. Due to the proximate arrangement of the various grid elements, the support grid 3 is provided with a zig-zag configuration which is complementary to the zig-zag configuration of a filter web 7 of the filter package 4 which will be explained hereinbelow.

For the sake of clearly illustrating the filter package, it is shown above the support grid. It constitutes an interchangeable filter unit which can be removed from the support grid after a certain degree of soilage has been reached and can be replaced by a new filter package.

The filter package comprises four stiff encircling walls 8, 9, 10 and 11 which form together with one another the same square shape as that formed by the frame 2. Adjacent encircling walls are joined together along their common edge by gluing them together, for example.

In the previous case, the encircling walls are produced of waxed cardboard. Together they form a rigid container in which the above-mentioned filter web 7 is contained. FIG. 1 shows that the filter web 7 is folded in a zig-zag fashion analogous to the shape of the support grid 3 to form sacks, the individual web segments 12 of the filter web having their lengths dimensioned such that they are only slightly shorter than the length L of the encircling walls. These walls 8, 9, 10 and 11 together form a cubical container which is open on two opposing end faces at least in the form illustrated in FIG. 1. The top end face in FIG. 1 constitutes the gas entrance port 13 and the bottom end face in FIG. 1 the gas discharge port 14. The direction of air flow is characterized by the arrows P in FIG. 1.

The folds 15 of the filter web are fringed by a strip of fabric adjacent to the gas entrance ports 13. This fabric strip protrudes laterally over the longitudinal edges of the filter web to form tabs 16 there. These tabs are maintained in short vertical slots which are located in the free marginal area of the encircling walls 8 and 10, both of which extend transversely to the direction of folding. The tabs 16 are held on the outside of the encircling walls by means of an adhesive strip 18 which encompasses the gas entrance port.

The longitudinal edges 19 and 20 of two adjacent web segments 12 of the filter web 7 forming a common fold at the gas entrance port 13 are mutually joined for the purpose of forming a filter pocket, e.g. with the aid of a similar strip of fabric as mentioned above in the case of folds 15. The resultant filter pockets converge conically towards the gas entrance port 13, while they diverge towards the gas discharge port 14.

The longitudinal edges of the web segments adjacent to the gas discharge port 14 are glued to the adjacent encircling walls so that the result is an encompassing sealing strip running along the periphery there which is composed of the respectively glued mouths of the filter pockets.

The folds 21 of the filter web 7 located adjacent to the gas discharge side 14 are held by a tension means 22 extending in the direction of the folds and anchored on the opposing encircling walls 8 and 10. The tension means consists of a 3 mm dia. wire in the present case which is simply pushed through the lateral encircling walls as shown in FIG. 3.

The encircling walls are pulled forward a bit along the edges adjacent to the gas discharge port so that a flat, free space 23 is formed. A cover 24 can be positioned in this free space whose dimensions are selected such that it can be jammed or lodged between the encircling walls.

The filter web 7 is provided with a lubricant and support layer 25 indicated in FIG. 1 on the side thereof facing towards the gas discharge port 14. This layer is glued onto the filter web, for example. It consists of a nylon fleece in the present case and makes it easier to insert and remove the filter package 4 from the support grid 6 while preventing damage to the filter web 7.

The filter package 4 in FIG. 1 is shown in its operational position. In order to convert the filter package into the transport form indicated in FIG. 2, it is provided that in each case a marginal strip R of each encircling wall 8, 9 10 and 11 which terminates at the gas entrance port 13 is bent in and folded over so that, as a result, the gas entrance port 13 is completely closed by the folded marginal strip as is evident from the top view in FIG. 4. The marginal strip is bent over and folded in the same way as in a folding box. FIG. 1 also shows that the encircling walls 8 and 10 each have a folding edge 26 extending transversely to the direction of flow P just like the two other encircling walls 9 and 11 and that, in addition, they also have two diagonal folding edges 27 and 28. These diagonal edges extend in the case of wall 8 from the points of intersection 29, 30 of the folding edge 26 with the joined edges of the encircling wall 8 with the walls 9 and 11 to form a common point of intersection 31 which is located in the center between the two afore-mentioned joined edges at the edge of the encircling wall 8 adjacent to the gas entrance port.

Analogously, the encircling wall 10 also comprises diagonal edges 27 and 28. The two walls 9 and 11, however, only have the one already mentioned folded edge 26. This is evident from FIG. 4 where the folded edges and the diagonal edges are indicated. Hand holes 32 for opening and holding the filter package 4 can be provided in the appropriate marginal strips of encircling walls 9 and 11.

When the gas filter 1 is put into operation, the filter package 4 must first be opened. To do this, the foldedover marginal strips R of the encircling walls 9 and 11 are folded upwardly with the aid of the hand holes 32 in the manner illustrated in FIG. 2, thereby causing the marginal strips of the encircling walls 8 and 10 to be folded up as well. The filter web is secured to the encircling walls 8 and 10 by means of the tabs 16 and, as the encircling walls are folded apart, the filter web will also be opened up to its full size as well.

The bottom 24 is withdrawn and removed before the filter package is finally positioned on the support grid.

The operator can thereafter lower the filter package onto the support grid in such a way that the filter pockets formed by the filter web are tucked over the individual grid elements of the support grid 3. The margin 23 of the encircling walls which is adjacent to the gas discharge port 14 comes to lies in the groove 5 of the frame 2.

To remove a soiled filter package, repeat these steps in reverse order.

What is claimed is:

1. A gas filter, in particular a room air filter, comprising encircling walls forming a square frame and an interchangeable filter package including a gas entrance and a gas discharge port and containing a filter web with a folded zig-zag configuration for forming a plurality of proximate filter pockets, said filter web being secured between the encircling walls of said frame, and further comprising a support grid for receiving the same which is mounted in the frame and which has a shape complimentary to the folds of said filter web, wherein all of said encircling walls of said frame have a stiff construction and together form a rigid container, said gas entrance port being adapted to be closed by bending in and folding over a portion of each of the encircling walls each of said walls having means which forms a marginal strip in each wall adjacent to said port, and tension means anchored to two of the encircling walls opposing one another securing the folds of the filter web adjacent the gas discharge port.

2. A gas filter according to claim 1 wherein the longitudinal edges of two adjacent web segments of a common fold of said filter web are joined together for the purpose of forming one of said filter pockets.

3. A gas filter according to claim 1 wherein the longitudinal edges of two adjacent web segments of a common fold at the gas entrance port are joined together.

4. A gas filter according to claim 1 wherein the longitudinal edges of the filter web adjacent to said gas discharge port are attached to the respective adjacent areas of the encircling walls.

5. A gas filter according to claim 1 wherein the filter web has its folds adjacent to said gas entrance port secured to the encircling walls by means of flexible tension elements.

6. A gas filter according to claim 5 wherein the filter web has tabs on both sides of the folds adjacent to the gas entrance port, said tabs being anchored in slots of the encircling walls extending transversely of the direction of the folds.

7. A gas filter according to claim 6 wherein the encircling walls holding the tabs are positioned such that they are the first to be bent inwardly when closing the gas entrance port.

8. A gas filter according to claim 1 further comprising a cover constructed so as to be positioned over the gas discharge part.

9. A gas filter according to claim 8, wherein the encircling walls (8,10) project like a border relative to the gas discharge port (14) and the cover (24) is constructed so as to be inserted into the free space formed thereby.

* * * * *